Patented July 7, 1931

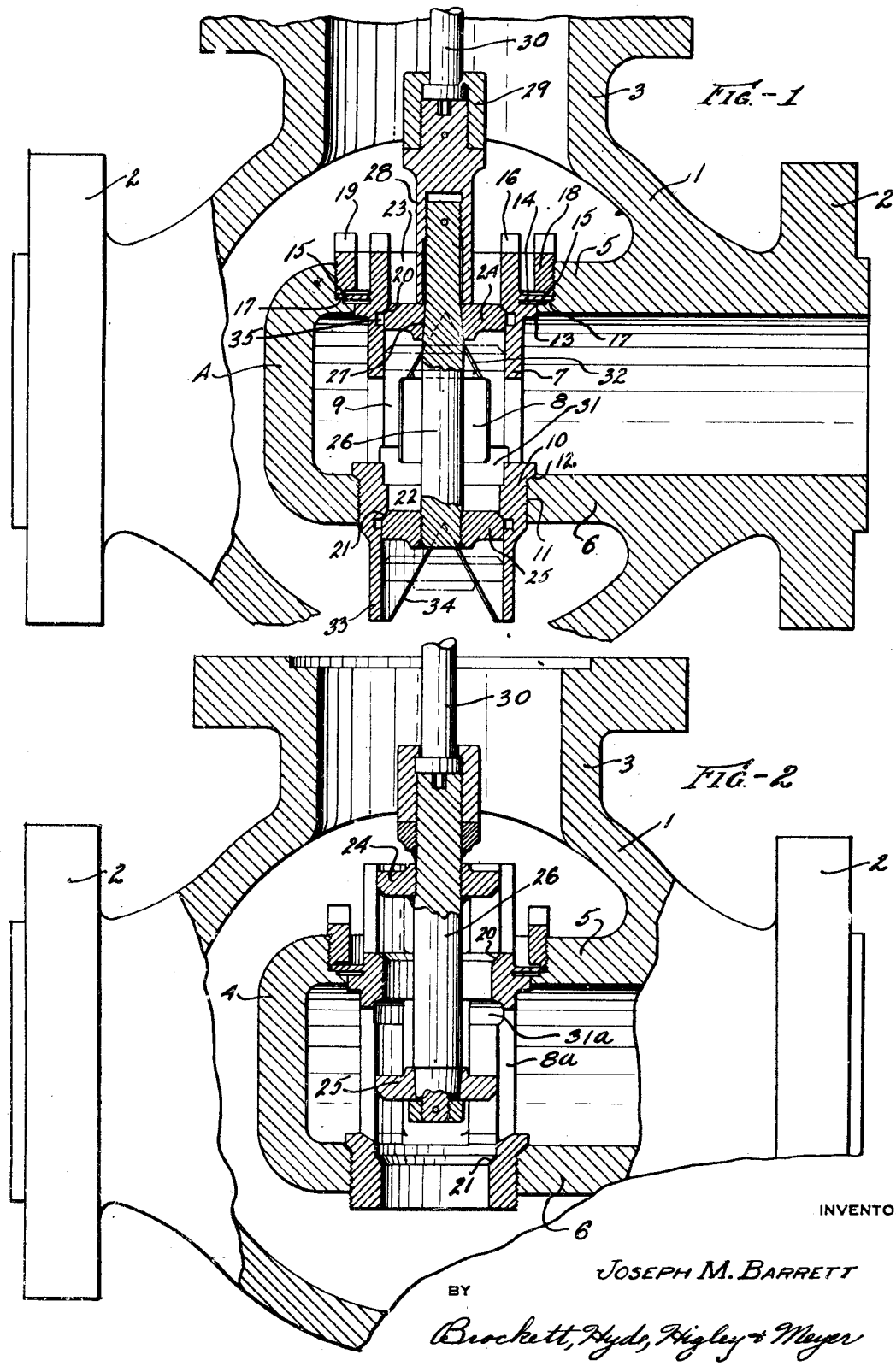

UNITED STATES PATENT OFFICE

JOSEPH M. BARRETT, OF CLEVELAND HEIGHTS, OHIO, ASSIGNOR TO BAILEY METER COMPANY, OF CLEVELAND, OHIO, A CORPORATION OF DELAWARE

BALANCED VALVE

Application filed October 17, 1928. Serial No. 313,055.

This invention relates to balanced valves used for controlling the flow of fluid pressure, such as steam, water, or other fluids. Such valves are usually employed in connection with relatively high pressures and are of relatively large size.

The object of the invention is to provide an improved valve which is truly balanced in the sense that its two valve discs or members and their cooperating seats are of identical area, avoiding any possible unbalancing due to a differential in the valve areas. A further object is to provide such a truly balanced valve in which the valve seats, valve stem, discs and other interior parts, usually called the trim, may be made of proper material, such as brass, Monel metal, or other corrosion resisting metal, with the casing or body of cheaper and stronger material, such as cast iron or steel, but nevertheless the valve stem, discs, seats, etc., may be readily and conveniently inserted into cooperating relation in the body.

A further object of the invention is to provide a balanced valve in which proper provision is made for expansion and contraction of the parts by variations in temperature, and particularly a valve in which the trim includes seat members coupled as a unit on the one hand and cooperating valve discs or members coupled as a unit on the other hand, both of which units may be made of like material and therefore with like coefficients of expansion, and also a valve in which the trim parts so constructed are so connected to the coarser metal shell or casing as to preserve sealed joints and be unaffected by expansion and contraction.

Other objects of the invention are in part obvious and in part will appear more in detail hereinafter.

In the drawings, Fig. 1 represents a sectional elevation of one form of valve embodying the invention, and Fig. 2 is a similar view illustrating another form of valve.

The valve shown in Fig. 1 comprises an outer shell or casing 1 which is of usual form and may be made of any suitable strong material, such as cast iron or steel. It is of T form with end members 2 suitably formed for connection to the supply and discharge conduits and with a lateral extension 3 through which the valve stem extends and which carries the bonnet (not shown). Within the valve chamber is located the dividing wall 4 between the supply and discharge sides of the valve chamber, said wall having spaced upper and lower parallel wall portions 5, 6, as is usual, said wall portions being provided with aligned openings to receive the trim.

The trim includes a cage-like generally tubular member 7 extending through both walls 5, 6, and between them provided with several side openings 8, three being usually employed, separated by longitudinal wall portions 9. At its lower end the cage sleeve is enlarged at 10 and is threaded at 11 for screwing it into the opening in the lower member 6 to a "home" position where its annularly tapered shoulder 12 seats on a like portion of the casing wall 6 to seal the joint.

The inner diameter of the opening in the upper wall is large enough so that the largest external diameter of the sleeve 7 at the shoulder 12 will pass through it, as is obvious. At its upper end the sleeve 7 is also enlarged to form a cylindrical portion 13, the periphery of which is a close sliding fit within the smallest portion of the opening in the upper wall. Above the cylindrical portion 13 the sleeve is annularly grooved as at 14 to form a relatively thin annular plate or flange 15, beyond which the sleeve is again reduced. At its upper end it is provided with a series, two or more, of endwise extending lugs or projections 16 to which a suitable tool may be applied for turning or otherwise manipulating it. The casing 1 at the opening in the upper wall is formed to provide an annular shoulder 17 to receive the outer margin of the flexible flange 15, which may be a thin flange held or clamped to said shoulder by the locking ring 18 screwed into the upper body wall 5 and provided with operating lugs 19.

The enlarged upper and lower portions of the cage or sleeve 7 are provided with upper and lower tapered seats 20, 21 respectively, which are identical in diameter, so that the smallest opening at 22 through the lower portion of the sleeve has the same area as the smallest opening 23 through the upper portion of the sleeve. Cooperating with said seats are two like valve members, an upper valve member 24 and a lower valve member 25, the latter being threaded upon the end of the stem 26 and the former being held on a tapered portion 27 of the stem by a nut 28 which at its outer end is suitably connected for operation, such as by being threaded to receive a union nut 29 for clamping a valve stem extension 30.

It is obvious that by more or less severely forcing the upper valve disc 24 to its seat on the tapered portion of the stem, and by adjusting the lower valve disc on its screw threads, the two valve discs may be brought to a position in which the distance between them is identical with the distance between the two tapered seats 20, 21 in the sleeve or cage. Therefore, by making the valve stem and cage of like material, both of brass, or both of Monel or other suitable metal, or by making them of two materials having the same coefficient of expansion, the two valve members will always seat at the same time and produce complete closure of the valve openings. Moreover, the valve cage is rigidly anchored by its threads 11 in the lower wall 6. At its upper end it is secured to the upper wall 5 only at the periphery of the thin flange 15, so that the cage or sleeve as a whole may expand and contract longitudinally with more or less bending or dishing of the thin flange 15 as though it were a washer. During such expansion and contraction the enlargement 13 slides up and down in the cylindrical upper wall opening in which it is a close sliding fit. Nevertheless, the clamping of the flange 15 provides a full and complete seal against the passage of fluid around the cage. Flange 15 may be integral with the casing and clamped to the sleeve, in which case it would usually be steel, but the arrangement shown, in which the flange is a part of the brass sleeve, is preferable.

Ordinarily, in this cage type of valve, one of the valve discs is made smaller than the other so that it can pass through the larger valve opening to its smaller seat at the other wall, all for purposes of assembly, but necessarily such arrangement produces an unbalanced condition. In the present construction the two seats and valve discs are of identical area. Therefore, special provision is made for assembly of the parts. In the arrangement shown in Fig. 1, the longitudinally extending arms or wall portions 9 have their inner surfaces continuations of the general inner cylindrical surface of the sleeve, so that the sleeve forms a guide for the valve discs. Consequently in a region adjacent the openings 8 and, as shown, below said openings, the inner surface of the sleeve is annularly grooved or channeled to form a recess 31, to provide extra space in which the disk 24 may be turned or cocked to transverse position after it has been pushed in through one of the openings 8. In other words, in assembling these parts the upper valve disc 24 is held with its general plane parallel with the sleeve axis and is pushed in through an opening 8. It is then moved down and its outer edge is pushed into the recess 31, enabling it to be turned into a crosswise position, whereupon it is centralized in the cage and moved up to its position at its upper seat, after which the stem 26 with the disc 25 secured thereto is assembled with the disc 24 and proper adjustment is made to space the two discs to correspond with the spacing of their seats.

The openings 8 are shown in Fig. 1 as provided with V-shaped or graduating extensions 32, and the lower extension 33 of the sleeve is provided with corresponding cut away V-portions 34, so that when the valve stem is moved toward open position the opening effect is progressive and graduated rather than abrupt, as would be the case if the end edges of the openings 8 were both transverse. Moreover, the cage wall, on its inner surface opposite the ends of the V-shaped extensions or cut away portions 32 and 34, is provided with annular grooves or channels 35, each lying just below one of the valve seats 20, 21. Therefore, when the valve is opened very slightly,—just "cracked"—the fluid travelling through the restricted orifices at the ends of the V-extensions is distributed annularly around the entire circumference of the valve and therefore equally to all portions of the seat, preventing to a large degree the wire drawing or wearing effects usually produced on the seats in valve members when graduation of the flow is attempted.

In the form shown in Fig. 1 the two valve discs seat upwardly. In the arrangement shown in Fig. 2 the valve discs seat downwardly. Also the cage openings 8a are rectangular and the annular channel 31a is at the upper end of the sleeve rather than at its lower end. Otherwise the constructions are generally the same.

What I claim is:

1. A balanced valve, comprising a valve body having two dividing wall portions, a tubular seat member extending between said wall portions, a cooperating valve member, and means flexibly connecting said seat member to one of said wall portions.

2. A valve of the class described, comprising a chambered casing provided with opposed wall portions, a seat member extending between said wall portions and provided with seat portions having the same area, the seat member being provided with openings separated by guiding arms, said openings having graduating extensions, and the seat member being provided with an annular channel communicating with the reduced end of the graduating extensions and adjacent to one of said seat portions.

3. A balanced valve, comprising a chambered casing provided with opposed dividing wall portions, a tubular seat member extending between said wall portions, means for rigidly attaching said tubular seat member to one of said wall portions, and means flexibly attaching it to the other wall portion.

4. A balanced valve of the form described in claim 3, in which said means comprises an annular flexible flange extending between the seat member and the wall portion to which it is secured.

5. A valve of the class described, comprising a chambered casing provided with dividing wall portions having openings, a hollow seat member extending between said openings and provided with seat portions, a valve stem, two valve members carried thereby and cooperating with said seat portions, said seat member being provided with lateral ports separated by guiding arms along which the valve members travel, said arms between the two seat portions forming a cage within which one of the valve members is housed, said housed valve member having a cylindrical portion sliding along the arms of its cage, and said cage being provided with a recess adjacent its ports to enable the housed valve member to be turned into transverse position in assembling the valve parts.

6. A valve of the class described, comprising a chambered valve casing provided with an extension adapted to suport a bonnet and having a chamber and two dividing wall portions having openings therein, a hollow seat member extending between said openings and provided with seat portions, a valve stem having two valve members cooperating with said seat portions, the seat member being provided at the bonnet end with an outwardly extending annular flexible flange, a nut for clamping said flange to one of said wall portions, said nut and the end of the seat portion being each provided with wrench holds accessible through the bonnet extension.

7. A valve of the class described, comprising a valve body having a valve stem opening at one side and a cross wall provided with two parallel portions lying in planes transverse to the length of the valve stem, said wall portions being provided with openings of different sizes, the larger opening being nearer to the valve stem opening of the body, and a cage member provided with valve seats of like diameter, said cage member being larger at one end than at the other and adapted for attachment to the cross wall by inserting its small end through the larger opening for attachment at the smaller opening and at its larger end being provided with an annular washer-like flange, and means for rigidly clamping the periphery of said flange to the cross wall at the larger opening.

In testimony whereof I hereby affix my signature.

JOSEPH M. BARRETT.